United States Patent
Rößner et al.

(10) Patent No.: US 12,055,207 B2
(45) Date of Patent: Aug. 6, 2024

(54) HOUSING HAVING AN ACCOMMODATING REGION FOR A MOUNTING PART OF AN ADD-ON UNIT

(71) Applicant: ZF FRIEDRICHSHAFEN AG, Friedrichshafen (DE)

(72) Inventors: Monika Rößner, Donnersdorf (DE); Thomas Bauer, Großbardorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 262 days.

(21) Appl. No.: 17/636,483

(22) PCT Filed: Aug. 20, 2020

(86) PCT No.: PCT/EP2020/073410
§ 371 (c)(1),
(2) Date: Feb. 18, 2022

(87) PCT Pub. No.: WO2021/032856
PCT Pub. Date: Feb. 25, 2021

(65) Prior Publication Data
US 2022/0282779 A1    Sep. 8, 2022

(30) Foreign Application Priority Data
Aug. 21, 2019   (DE) ............ 10 2019 212 474.7

(51) Int. Cl.
| | |
|---|---|
| *F16H 57/02* | (2012.01) |
| *F16D 25/10* | (2006.01) |
| *F16H 57/025* | (2012.01) |

(52) U.S. Cl.
CPC .......... *F16H 57/025* (2013.01); *F16D 25/10* (2013.01); *F16H 2057/02026* (2013.01)

(58) Field of Classification Search
CPC .............................. F16H 57/02; F16H 57/025
(Continued)

(56) References Cited

U.S. PATENT DOCUMENTS 4,724,745 A * 2/1988 Sumiya ............... F16D 25/0638
192/85.41
4,833,295 A * 5/1989 Locker ................... F16H 41/24
219/121.13
(Continued)

FOREIGN PATENT DOCUMENTS

| DE | 19755168 | 6/1999 |
|---|---|---|
| DE | 10301771 | 7/2004 |

(Continued)

OTHER PUBLICATIONS

Office Action of the corresponding German Patent Application No. 10 2019 212 474.7.

*Primary Examiner* — Ha Dinh Ho
(74) *Attorney, Agent, or Firm* — Cozen O'Connor

(57) ABSTRACT

A housing is provided with a receiving area for a mounting part of a mount assembly fastened to the receiving area by a substance-to-substance bond. The receiving area has a centering portion for the mounting part and possibly a positioning portion for the mounting part which is operative in axial direction and transitions into an adjacent housing wall via a housing edge. The receiving area is provided in the radial extension region of the housing edge with a clearance operative in axial direction relative to the mounting part.

5 Claims, 3 Drawing Sheets

(58) Field of Classification Search
USPC .............................................. 74/343, 606 R
See application file for complete search history.

(56) References Cited

U.S. PATENT DOCUMENTS

| | | | |
|---|---|---|---|
| 4,867,641 A | | 9/1989 | Okuno et al. |
| 5,168,142 A | | 12/1992 | Gartner et al. |
| 5,521,349 A | * | 5/1996 | Okamoto ............... B23K 11/14 |
| | | | 219/93 |
| 6,781,266 B2 | * | 8/2004 | Le .......................... F16C 33/107 |
| | | | 310/90 |

FOREIGN PATENT DOCUMENTS

| | | |
|---|---|---|
| DE | 102004015964 | 10/2005 |
| DE | 102005023230 | 11/2006 |
| EA | 200900206 | 8/2010 |

* cited by examiner

HOUSING HAVING AN ACCOMMODATING REGION FOR A MOUNTING PART OF AN ADD-ON UNIT

CROSS REFERENCE TO RELATED APPLICATIONS

This is a U.S. national stage of Application No. PCT/EP2020/073410 filed Aug. 20, 2020. Priority is claimed on German Application No. DE 10 2019 212 474.7 filed Aug. 21, 2019 the content of which is incorporated herein by reference.

BACKGROUND OF THE INVENTION

1. Field of the Invention

The disclosure is directed to a housing with a receiving area for a mounting part of a mount assembly fastened to the receiving area by a substance-to-substance bond, the receiving area being provided with a recess having a centering portion for the mounting part and having a positioning portion for the mounting part that is operative in axial direction and transitions into an adjacent housing wall via a housing edge.

2. Description of Related Art

An area of a housing of this kind is shown in FIG. 1 as an example of the prior art. The housing 100 has a receiving area 101 which has a centering portion 102 for a mounting part 110 of a mount assembly 111 and a positioning portion 103 for this mounting part 110. The centering portion 102 extends at least substantially axially, while the positioning portion 103 extends at least substantially radially and directly adjoins the centering portion 102. The substance-to-substance bond 108 operative between the mounting part 110 and the housing 100 is provided in the radial extension region of the centering portion 102. The positioning portion 103 transitions by a housing edge 106 into the adjoining housing wall 107. This housing edge 106 is disadvantageously noticeable after the substance-to-substance bond 108 has been produced, since it initiates the introduction onto the mounting part 110 of an axial force which is directed away from the housing 100 and which loads the substance-to-substance bond 108.

SUMMARY OF THE INVENTION

It is an object of one aspect the invention to form a receiving area at a housing serving to receive a mounting part of a mount assembly such that the mounting part is received at the housing so as to be free from axial force after a substance-to-substance bond has been produced.

According to one aspect of the invention, a housing is provided with a receiving area for a mounting part of a mount assembly which is fastened to the receiving area by a substance-to-substance bond, the receiving area having a centering portion for the mounting part and possibly a positioning portion operative in axial direction for the mounting part which transitions via a housing edge into an adjacent housing wall.

It is particularly important that the receiving area is provided, at least in the radial extension region of the housing edge, with a clearance operative in axial direction relative to the mounting part.

Because it is provided at least in the radial extension region of the housing edge, the clearance creates a distance between this housing edge and the mounting part of the mount assembly and accordingly prevents the housing edge from reacting on the mounting part by an axial force operative in direction of the mount assembly. This ensures a load relief of the substance-to-substance bond by which the mounting part of the mount assembly is to be fastened to the housing and, therefore, reduces the risk of damage to this substance-to-substance bond. The housing can be the housing of a coupling device, for example, such as a hydrodynamic torque converter, hydro clutch, or wet clutch such as is commonly applied in a motor vehicle, for example. On the other hand, the mounting part can be part of a clutch device which can be used in a motor vehicle, for example, to supplement a coupling device when this motor vehicle has, in addition to an internal combustion engine as first drive, an electric machine as second drive, the clutch device providing for the connection of the respective drive to an output, for example, a multi-ratio shift transmission.

With regard to the centering portion of the receiving area, this centering portion runs at least substantially in axial direction for centering the mounting part, while the positioning portion of the receiving area is provided to run at least substantially in radial direction for the axial support of the mounting part. It is particularly preferable that the clearance is provided at the positioning portion in a first embodiment to extend radially inward starting at the housing edge so as to run at least substantially parallel to an engagement surface of the mounting part up to an axial engagement surface of the positioning portion. When the positioning portion directly adjoins the centering portion, the clearance preferably opens into the axial engagement surface of the positioning portion by a rounded portion.

If the substance-to-substance bond is provided in the extension region of the centering portion, the clearance is separated from the substance-to-substance bond by the axial engagement surface of the positioning portion.

When arranged in this way, the clearance is provided in the radial extension region of the housing edge and accordingly produces the desired actual distance between this housing edge and the associated engagement surface of the mounting part of the mount assembly. At the same time, the axial engagement surface provided radially between the clearance and the centering portion ensures a good axial support of the mounting part of the mount assembly at this engagement surface.

In a second embodiment, the housing is provided with a centering portion at the receiving area, this centering portion running at least substantially in axial direction for centering the mounting part. The clearance approaches an engagement surface of the mounting part at an angle α starting at the housing edge to form an axial engagement surface with its radially inner end for the mounting part of the mount assembly. Accordingly, this embodiment has the advantage that it does not require a separate positioning portion with an axial engagement surface at the receiving portion because this task is already taken over by the clearance.

If the clearance is guided radially inward up to the centering portion and if the substance-to-substance bond is provided in the extension region of this centering portion, the clearance together with the mounting part contributes to the formation of the substance-to-substance bond. The angle α of the clearance should be less than 90° with respect to the engagement surface 16 of the mounting part 4 and particularly preferably has at least substantially the value of 75°.

In a construction of this kind, the clearance has the maximum axial extension region precisely in the radial region in which the housing edge is present, while the axial extension region decreases with increasing radial distance from this housing edge. The axial extension region is reduced to zero at the latest by the time the centering portion is reached. When the radial extension of the clearance leads up to the centering portion and the substance-to-substance bond is likewise provided in the region of the centering portion, it is ensured that the substance-to-substance bond is always formed outside of a material-free space such as the clearance.

BRIEF DESCRIPTION OF THE DRAWINGS

The housing will be described in more detail in the following referring to drawings. The drawings show.

DETAILED DESCRIPTION OF THE PRESENTLY PREFERRED EMBODIMENTS

Figure 2:
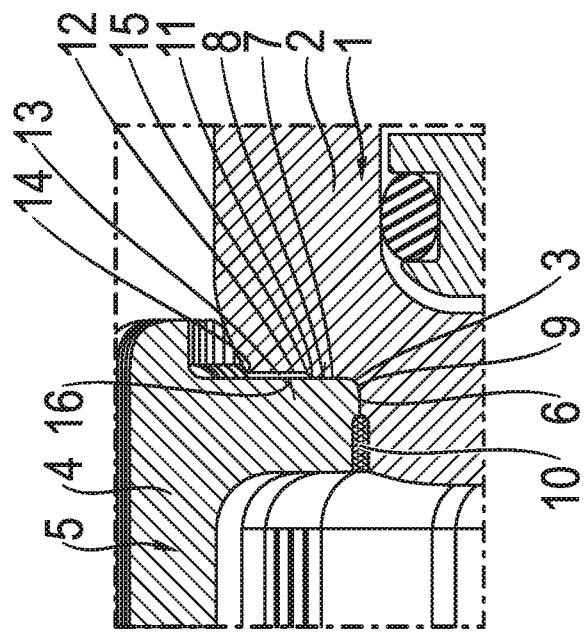
FIG. 2 is a housing with clearance extending axially between a housing edge of the housing and the mounting part of a receiving unit.
Figure 1:
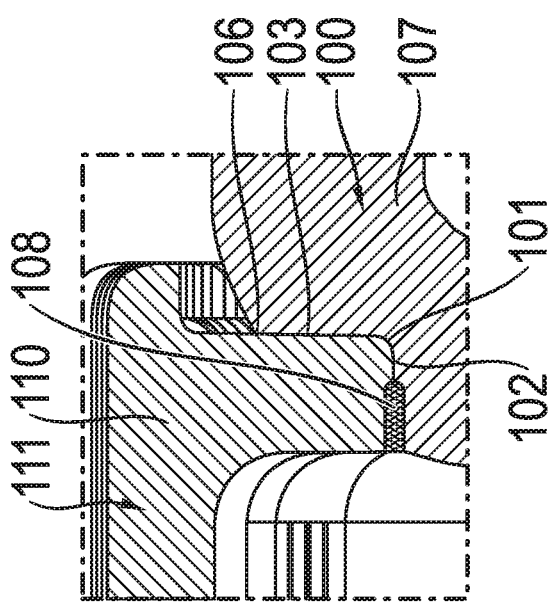
FIG. 1 is a housing according to the prior art which has a receiving area with centering portion and positioning portion for receiving a mounting part of a receiving unit.

FIG. 2 shows a region of a housing 1 that has a receiving area 3 for a mounting part 4 of a mount assembly 5 in a housing wall 2. This receiving area 3 has a centering portion 6 and a positioning portion 7, the centering portion 6 centers the mounting part 4 and running at least substantially axially, while the positioning portion 7 is provided with an axial engagement surface 8 for the axial positioning of the mounting part 4 and extends at least substantially radially. The positioning portion 7 directly radially adjoins the end 9 of the centering portion 6 facing the housing wall 2 and has, at its radially inner area directly adjoining the centering portion 6, the axial engagement surface 8 for the mounting part 4. A substance-to-substance bond 10 in the form of a weld is provided at least substantially radially inside of this axial engagement surface 8 between the mounting part 4 and the housing 1 and, accordingly, in the extension region of the centering portion 6. A clearance 12 is provided radially outside of the axial engagement surface 8, preferably at the radially outer end 11 thereof, by which clearance 12 an axial gap 13 is formed between an axial engagement surface 16 of the mounting part 4 and a housing edge 14 of the housing wall 2. Due to this axial gap 13 and, therefore, clearance 12, the housing edge 14 may not exert a reaction on the axial engagement surface 16 of the mounting part 4 and accordingly also no axial force which is directed away from the housing 1 and which could lead to damage to the substance-to-substance bond 10 by loading the latter.

Figure 3:
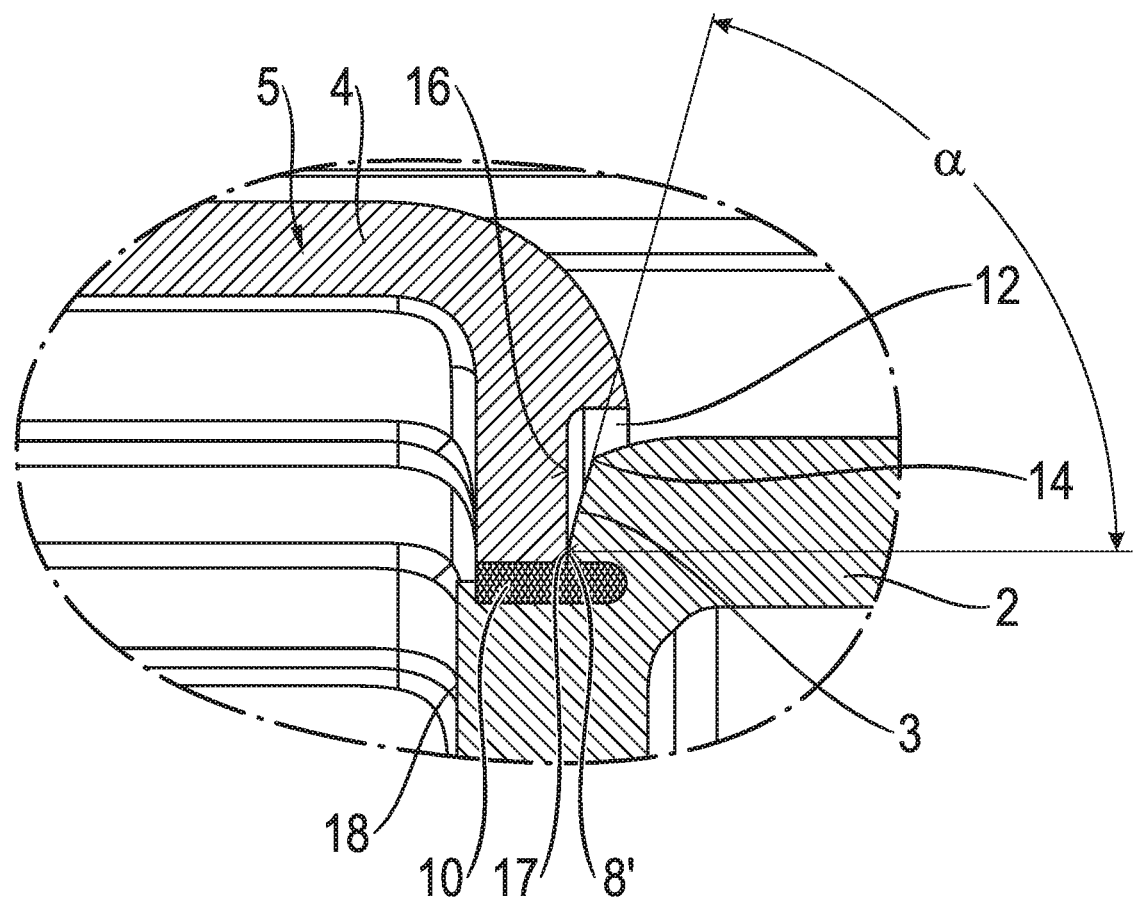
FIG. 3 is a housing with a notch-shaped clearance.

The clearance 12 can be formed, according to FIG. 2, in such a way that it extends radially inwardly starting at the housing edge 14 and running at least substantially parallel to the engagement surface 16 of the mounting part 4 so as to run into the axial engagement surface 8 of the positioning portion 7 by a rounded portion 15. Alternatively, the clearance 12 according to FIG. 3 can also approach the engagement surface 16 of the mounting part 4 at an angle α, likewise starting at the housing edge 14, where this angle α should be less than 90° with respect to the engagement surface 16 of the mounting part 4 and, for example, as is shown in FIG. 3, can have a value of 75°. In this embodiment, the clearance 12 leads radially inward to the extent that the radially inner end 17 thereof serves as an axial engagement surface 8' for the mounting part 4 and simultaneously, together with the mounting part 4, contributes to the formation of the substance-to-substance bond 10 which is formed proceeding from the free side 18 of the housing wall 2 facing in direction of the engagement surface 8'.

According to the description up to this point, the clearance 12 is provided at the receiving area of the housing 1, but it will be appreciated that a clearance can also be provided at the mounting part 4 of the mount assembly 5, for example, in the engagement surface 16 of the mounting part 4.

Figure 4:
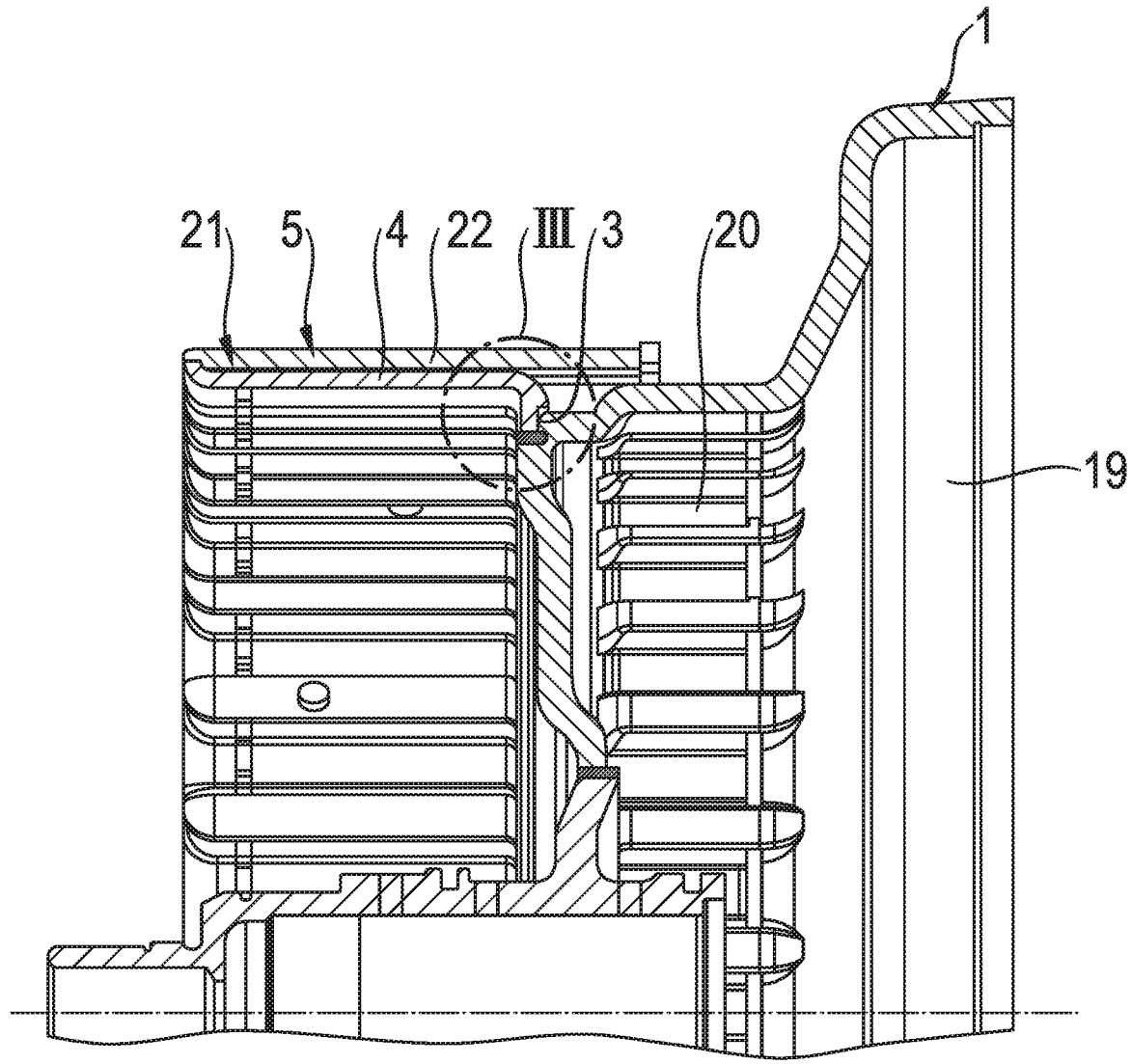
FIG. 4 is a housing and receiving unit.

While the figures discussed up to this point have only shown sections of housing 1 and mounting part 4 of mount assembly 5, a larger area is shown in FIG. 4. As will be seen, the housing 1 can be part of a coupling device 19, for example, which is at least partially filled with fluid such as, for example, a hydrodynamic torque converter, a hydro clutch, or a wet clutch such as is commonly applied in a motor vehicle, for example. According to FIG. 4, the housing 1 is provided with a profile 20 that can serve to receive plate-shaped clutch elements. The mounting part 4 received at the receiving area 3 of the housing 1 can be part of a clutch device 21 that can be used in a motor vehicle, for example, to supplement a coupling device 19 when this motor vehicle has, in addition to an internal combustion engine as first drive, an electric machine as second drive, and the clutch device 21 provides the connection of the respective drive to an output, for example, a multi-ratio shift transmission. In the embodiment shown in FIG. 4, a support 22 received by the mounting part 4 serves to position the electric machine mentioned above.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A housing comprising:
   a receiving area for a mounting part of a mount assembly which is fastened to the receiving area by a substance-to-substance bond,
   wherein the receiving area has at least one of:
      a centering portion for the mounting part and
      a positioning portion for the mounting part operative in an axial direction, which transitions into an adjacent housing wall via a housing edge; and
   a clearance, operative in the axial direction relative to the mounting part, provided at least in a radial extension region of the housing edge in the receiving area,
   wherein the centering portion at the receiving area runs at least substantially in axial direction for centering the mounting part, and wherein the clearance approaches an engagement surface of the mounting part at an angle starting at the housing edge to form an axial engagement surface for the mounting part of the mount assembly with its radially inner end, wherein the angle of the clearance is less than 90° with respect to the engagement surface of the mounting part.

2. The housing according to claim 1, wherein the substance-to-substance bond is provided in an extension region of the centering portion, and wherein the clearance is separated from the substance-to-substance bond by an axial engagement surface of the positioning portion.

3. The housing according to claim 1, wherein the substance-to-substance bond is provided in an extension region of the centering portion, and wherein the clearance is guided radially inward up to the centering portion to contribute to formation of the substance-to-substance bond together with the mounting part.

4. The housing according to claim 1, wherein the angle of the clearance at least substantially has a value of 75° with respect to the engagement surface of the mounting part.

5. The housing according to claim 1, wherein the angle of the clearance at least substantially is greater than 0° with respect to the engagement surface of the mounting part.

* * * * *